March 1, 1960 G. KERN, JR 2,927,149
JUNCTION BOX FOR SOFT SHIELDED CABLE AND METHOD OF WIRING IT
Filed March 25, 1953

Witness
Edward P. Seeley

Inventor
George Kern Jr.
by Landrum A. MacEachron
Attorney

United States Patent Office 2,927,149
Patented Mar. 1, 1960

2,927,149

JUNCTION BOX FOR SOFT SHIELDED CABLE AND METHOD OF WIRING IT

George Kern, Jr., Des Moines, Iowa

Application March 25, 1953, Serial No. 344,566

1 Claim. (Cl. 174—65)

My invention is a novel junction box for electrical wiring such as those used where switches, outlets or electrical fixtures are installed and a new method of wiring permitted by the use of my new box.

Junction boxes commonly used today are stamped and bent from sheet metal. Means are provided for securing the box to the sub-plaster portion of a wall and also for securing the unit that is installed to the box. The unit usually provides a means for securing the cover plate to the installed assembly. The sides and ends of the conventional box are provided with partially stamped out plugs or knock-outs as they are called in the art. These knock-outs are generally circular in form and are of a size that will permit only one cable to be inserted through them. Because only one cable can be inserted through any one hole it is usually necessary when wiring a group of outlets in a parallel circuit to cut the wire or conductor at each junction box. This cutting of the two conductor fiber cable makes it necessary to solder the ends of the two positive wire together and grounded wires together and secure a pigtail to each pair which are used to join the wires to the unit. The soldered joint must be taped or otherwise insulated of course, first with rubber tape and then with friction tape. All of these steps have been thought necessary until now because of safety precautions that militate against putting more than one wire on a single binding post.

Even with all of these precautions some difficulties are encountered. The most careful soldering can cause tiny sharp projections of solder to be formed on the joints. This is particularly true of joints that are soldered by means of a torch rather than by means of the slower soldering pot method. The skilled electrician will remove all of these sharp projections, of course, in order to avoid the possibility of puncturing the insulating tape and thereby causing a ground or at least creating the possibility of having a short circuit. In spite of all precautions however some of these sharp projections are left from time to time. They can cause no end of trouble. When the apprentice workman is not supervised closely enough such sharp edges are often left. In any event much time is consumed in attempting to adjust the troubles that can follow from failure to remove sharp edges.

Also, of course, no matter how well the joint is made, it is not as good a conductor as the wire is when it remains unbroken. A poor joint offers large resistance to the flow of electrical energy or current as it is sometimes called. A high resistance uses much voltage in forcing current to flow through it and also causes heat to be generated. It is understandable therefore why joints are undesirable and particularly when not well made, as by a novice.

Still another problem that has developed to a greater degree recently than in the two decades just preceding the present one is the great amount of home electrical wiring that is being done by amateurs. Many manufacturers are recognizing this trend and are putting out materials in kits or the like with instructions for the home mechanic. Fortunately many people are still afraid of electricity and will not attempt to do their own wiring. Many, particularly farmers, do however and in at least many cases the work is improperly done. Nevertheless people continue to try to do their own work and a more or less foolproof method of wiring would be very desirable to say the least.

In view of all of the shortcomings of the prior art, therefore, it is the principal object of my invention to provide a junction box for soft shielded cable that will be safer to use than boxes known now.

It is a further object of my invention to provide a junction box for soft shielded cable that can be installed with less effort.

It is a further object of my invention to provide a junction box for soft shielded cable that requires the use of less material to install it.

It is a further object of my invention to provide a junction box for soft shielded cable that will meet the requirements of the National Underwriters Code.

It is a further object of my invention to provide a junction box for soft shielded cable that will make it possible for relatively unskilled persons to do safe electrical wiring.

It is a further object of my invention to provide a junction box for soft shielded cable that is economical as compared to junction boxes now in use.

These and other objects will be apparent to those skilled in the art.

My invention consists in the construction, arrangement and combination of the various parts of the device, whereby the objects contemplated are attained as hereinafter more fully set forth, and specifically pointed out in my claim, and illustrated in the accompanying drawings, in which:

Figure 3:
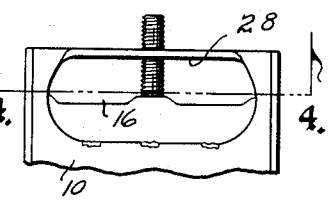
Figure 4:
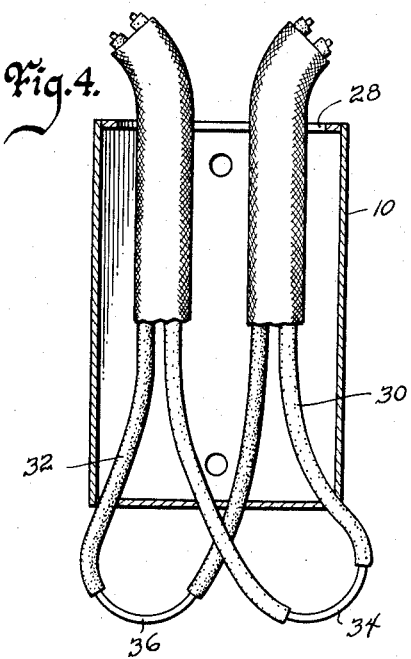
Figure 5:
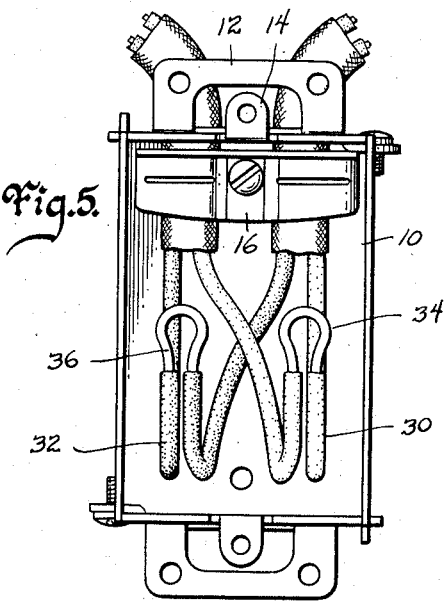

Fig. 3 is an enlarged fragmentary view of my new junction box showing all of the knock-outs removed. The cable clamp remains shown in position, Fig. 4 is an enlarged vertical sectional view of my new junction box taken substantially on the line 4—4 of Fig. 3 except that the cable clamp is shown removed and with a loop of wire drawn into the junction box, and Fig. 5 is an enlarged front elevation view of my new junction box shown with the wires skinned and the cable clamped ready for use.

Referring to the drawings I have used the numeral 10 to designate the body of the junction box generally. The box is equipped with the usual movable mounting flanges 12 and 12a. The customary unit holding ears are designated by the numeral 14. The numeral 16 designates the usual cable clamp which is used to secure the conductors in the box as to absorb mechanical strains on the wire. Any pulls applied to the cable will be applied to the box and not to the unit connected to the wire. It is to be understood that certain of the knock-outs have been omitted as they are not necessary to an understanding of my invention. The box can be provided with as many knock-outs as may seem advisable. Up to this time the box is rather conventional but I will now describe my invention.

Figure 1:
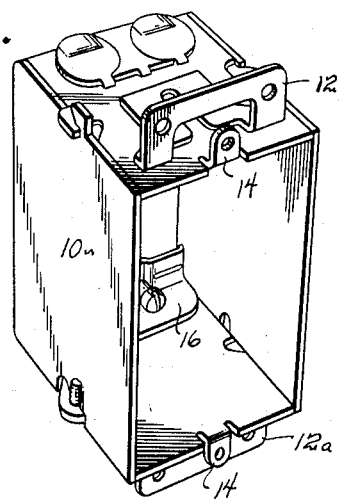
Fig. 1 is a perspective view of my new junction box.
Figure 2:
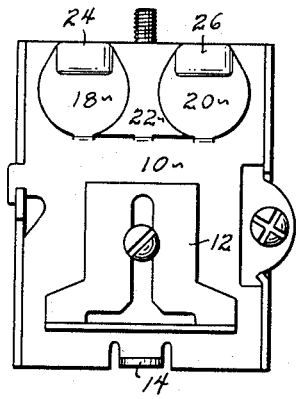
Fig. 2 is an enlarged plan view of my new junction box.

As shown in Figs. 1, 2 and 3, my invention is a novel form of knock-outs. The numerals 18 and 20 designate two knock-outs of the conventional shape. The numeral 22 designates a third knock-out that is shaped to fit the space between the other two knock-outs. The purpose of the center knock-out is to permit the removal of all of the box at the point where the wire enters the box as shown in Fig. 3. The usual knock-outs are provided with the usual raised portions 24 and 26 respectively so that a screw driver can be inserted and the knock-outs pried out. There is no need to have such a raised portion on the center knock-out since the center knock-out is never removed unless at least one of the outer knock-outs is removed and easy access is then had to the center knock-out. It would be possible obviously to have the knock-out all one-piece shaped like the opening designated 28 in Fig. 3. If the knock-outs are made as shown in Figs. 1 and 2, however, the box can be used in the same manner as the conventional box if desired. Also, of course, it would be possible to cut each of the major knock-outs in the shape of one-half of the final opening shown in Fig. 3. With the teachings of this application before him it would seem that any skilled mechanic could make such alterations in the form of box shown by me as the preferred form.

The use of the box is very simple. With the box mounted in the usual manner and with the knock-outs removed as shown in Fig. 3, clamp 16 completely removed; a loop of wire is drawn into the box as shown in Fig. 4. Fig. 4 shows the cable stripped and exposed which is the next step after the cable has been drawn through the opening made by removing the knock-out. With the outer covering removed the positive or hot wire 30 and the grounded wire 32 are exposed and the inner insulation can be stripped. The bare wires 34 and 36 are then ready to be formed into loops as shown in Fig. 5 so that a unit can be secured to them electrically. The cable is then clamped under the clamp 16 and the box is ready to receive an outlet or some other electrical unit. Obviously this system cannot be used with the old form of knock-out. Equally obviously my box makes it possible to avoid all of the difficulties outlined in the discussion of the prior art. Since the wire can be inserted into the box without cutting there is no need to make a joint. Since there is no joint all of the troubles that attend making the joint are eliminated. Also, both the labor and the material required for soldering are eliminated. Also, the amount of wire that must be placed back in the box is greatly reduced which means that the whole job is further simplified.

As a matter of interest I have summarized the savings that can be effected by using my junction box. For each box mounting a single unit, I have estimated, at wholesale prices, that sixteen cents (16¢) to seventeen cents (17¢) can be saved. This estimate includes the wire normally used for a pigtail, the rubber tape, the friction tape, the soldering supplies and the gasoline or liquefied so-called bottle gas used for heating the soldering crucible. The labor measured in dollars at the current union scale in Des Moines is about ninety-three cents (93¢). This makes a total saving of at least one dollar and nine cents ($1.09) per single installation and slightly less if several, say ten boxes, are wired at one time. Over all I estimate an average savings of approximately one dollar ($1.00) per box as a conservative estimate. It seems clear to me, therefore, that I have invented a junction box that will accomplish the objects of my invention.

There are, furthermore, situations where my box will accomplish objects that the prior art cannot accomplish at all. In short, there are some things that can be done with my junction box that are completely beyond the ability of the usual junction box such as the type known as "Gem" boxes in the trade. For example, with certain sizes of junction boxes it is practically impossible to use a switch rated at twenty (20) amperes, if the switch is one that will handle a load of twenty (20) amps. Such good twenty (20) amp. switches as General Electrics and those made by Hubble are just too large to fit in the smaller junction boxes that are wired in the old manner with the pigtails. When my system is used, however, the amount of wire used is enough less to make it possible to use these large switches even in the smaller boxes. It should be obvious also that even an amateur cannot make any serious mistakes with my junction boxes as far as using the box and preparing the wires is concerned.

It is clear that my box is not only novel in itself, but also makes it possible to wire a box in an entirely new manner. I am claiming, therefore, not only the box structure but also the method of wiring that is possible when using my new junction box.

Some changes may be made in the construction and arranged of my junction box for soft shielded cable and method of wiring it without departing from the real spirit and purpose of my invention, and it is my intention to cover by my claim, any modified forms of structure or use of mechanical equivalents which may be reasonably included within its scope.

I claim:

A method of wiring a junction to permit supplying a series of outlets with a single jointless cable; said box having walls and a bottom; said method comprising; making a single opening in a wall of said junction box adjacent its bottom; making a loop in a piece of soft shielded cable; passing said loop through the opening in said junction box wall; clamping said cable to said box near said box wall by means of a screw extending between the two portions of cable forming said loop and threading into the bottom of said box; removing the outer covering of said cable from said loop to a point near said box wall; removing the insulation from the wires of said cable at points most distant from said box wall; all the while retaining the wires in a whole condition; and bending the bared wires into terminal binding post receiving loops.

References Cited in the file of this patent

UNITED STATES PATENTS

| | | |
|---|---|---|
| 782,417 | Robb | Feb. 14, 1905 |
| 977,643 | Manquais | Dec. 6, 1910 |
| 1,608,621 | Sachs | Nov. 30, 1926 |
| 1,822,128 | Clayton | Sept. 8, 1931 |
| 1,845,639 | Wermine | Feb. 16, 1932 |
| 2,000,850 | Knell | May 7, 1935 |
| 2,240,187 | Kingdon et al. | Apr. 29, 1941 |
| 2,659,765 | Dunn | Nov. 17, 1953 |
| 2,663,454 | Olson | Dec. 22, 1953 |

FOREIGN PATENTS

| | | |
|---|---|---|
| 7,614 | Great Britain | 1838 |